United States Patent [19]

Smith

[11] 4,168,844
[45] Sep. 25, 1979

[54] ANTI-ROCK INSTALLATION FOR MOTOR HOMES

[76] Inventor: Paul W. Smith, P.O. Box 868, Burbank, Calif. 91503

[21] Appl. No.: 853,297

[22] Filed: Nov. 21, 1977

[51] Int. Cl.$^2$ ............................................. B62D 5/06
[52] U.S. Cl. .................................... 280/111; 280/126
[58] Field of Search ................... 280/126, 111, 112 R, 280/111 A, 689

[56] References Cited

U.S. PATENT DOCUMENTS

| | | | |
|---|---|---|---|
| 3,408,089 | 10/1968 | Edwards | 280/111 |
| 3,484,119 | 12/1969 | Cagle | 280/111 |
| 3,994,362 | 11/1976 | Penington | 280/111 |

*Primary Examiner*—Richard A. Bertsch
*Attorney, Agent, or Firm*—Freilich, Hornbaker, Wasserman, Rosen & Fernandez

[57] ABSTRACT

Apparatus for the installation on motor homes to greatly reduce rocking, that is, repeated tilting of the rear of the vehicle from one side to the other. The installation includes an auxiliary pair of shock absorbers installed so that the lower end of each shock absorber lies under the leaf spring of the vehicle and the other end lies at the inner side of the longitudinal beam at the under side of the vehicle, to enable a long shock absorber to be installed that extends in a largely lateral direction. It has been found that such auxiliary shock absorbers extending at an angle of about 30° from the vertical, produce a large and unexpected deduction in rocking of motor home type vehicles that have long rearward overhangs behind the wheels.

6 Claims, 6 Drawing Figures

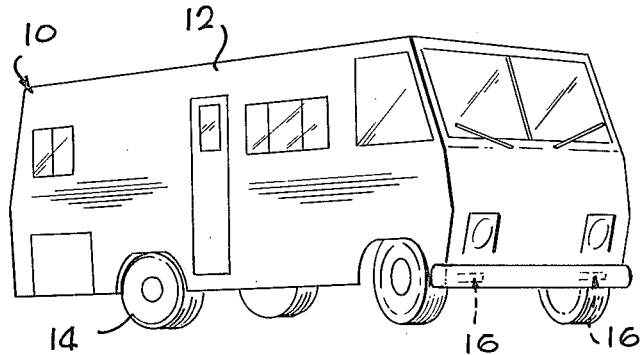
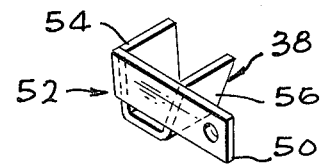
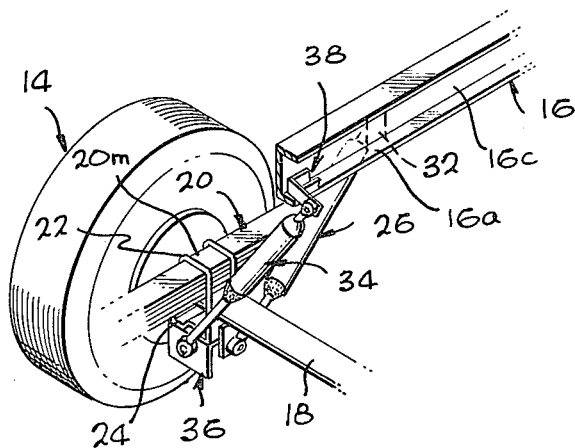
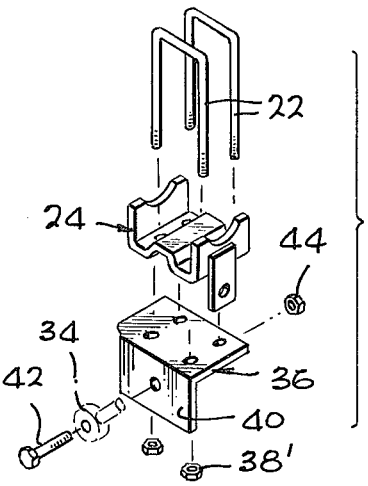
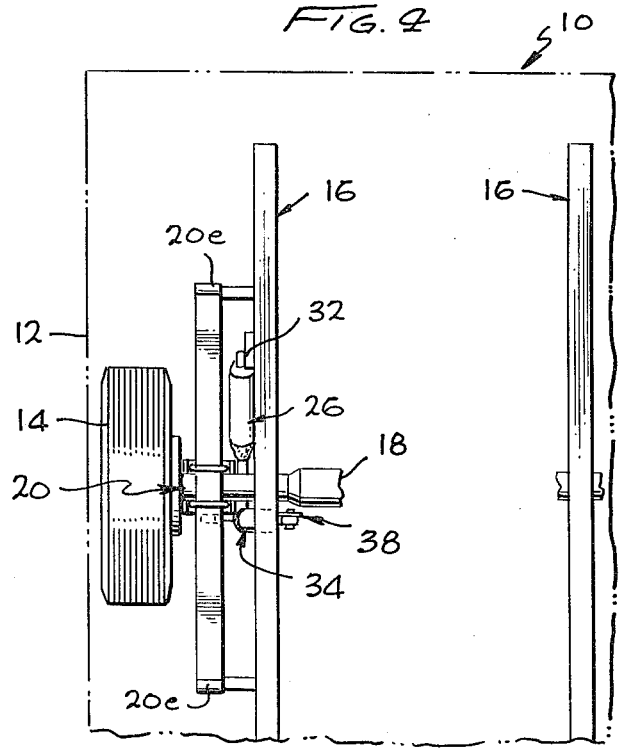

ANTI-ROCK INSTALLATION FOR MOTOR HOMES

BACKGROUND OF THE INVENTION

This invention relates to an anti-rock installation for motor home type vehicles which have large rear overhangs.

Motor homes are typically constructed with long boxy enclosures that provide a large area for living quarters, but with chassis considerably shorter than the enclosures for maneuverability, leading to considerable overhang of the rear of the enclosure behind the wheels. A very disconcerting effect that is typically experienced in such motor homes, is that there is large amplitude rocking of the enclosure, especially the rearward portion thereof, during the forward motion of the vehicle. Various arrangements of the rear shock absorbers have been utilized, but with most rear shock absorbers extending at an upward and longitudinal direction (along the length of the vehicle) in order to minimize pitching of the vehicle (the rear end moving up and down) which can become dangerous. An obvious way to minimize rocking would be to mount shock absorbers vertically at either side of the rear end of the vehicle. However, the installation of such verticle shock absorbers has not been found to significantly reduce rocking. It has been assumed that rocking cannot be easily solved in motor homes, and that owners must simply learn to bear the discomfort.

SUMMARY OF THE INVENTION

In accordance with one embodiment of the present invention, an anti-rock installation is provided for motor homes, which can be installed at moderate cost in an already constructed vehicle, and which has been found to produce a large reduction in rocking of the vehicles. The installation includes a lower coupling that can be mounted directly under the already-included coupling that holds the already-installed shock absorber, an upper mounting device that readily attaches to a longitudinal beam at the underside of the motor home enclosure, and an auxiliary shock absorber which can be attached to the coupling and mounting device. The coupling and mounting device enable an auxiliary shock absorber of considerable length to be easily installed, with its lower-outer end lying under the leaf spring assembly which is adjacent to a vehicle wheel, and with the upper-inner end of the shock absorber lying at the inner side of the longitudinal beam. Installations wherein the auxiliary shock absorber extends at approximately 30° from the vertical, have been found to produce a great decrease in rocking of the vehicle, as well as further reducing pitching.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a motor home vehicle constructed in accordance with the present invention.

FIG. 2 is a partial perspective view of one side of the vehicle showing the suspension apparatus thereof.

FIG. 3 is an end elevation view of the apparatus of FIG. 2.

FIG. 4 is a view taken on the line 4—4 of FIG. 3.

FIG. 5 is a perspective view of the bracket of FIG. 2.

FIG. 6 is a perspective view of of the mounting bracket.

DESCRIPTION OF THE PREFERRED EMBODIMENT

FIG. 1 illustrates a motor home 10 which includes a long and tall enclosure 12 for holding persons, wherein the enclosure overhangs the rear wheels 14 by a considerable amount. The overhanging permits a large volume enclosure to be provided, on a chassis of moderate length for maneuverability. As shown in FIG. 2, the enclosure is supported on a pair of elongated longitudinally-extending beams 16 of C-shaped cross section that are, in turn, supported on the rear axle 18 of the vehicle. A typical suspension system provided by the factory, includes a leaf spring assembly 20 that has a middle portion 20m lying on the axle 18 and opposite ends 20e that support the longitudinal beams 16. The middle of the leaf spring assembly is held down to the axle by a pair of U-shaped rods 22 that extend over the leaf spring assembly and are fastened to a mount 24 lying below the axle. A shock absorber 26 is also included, primarily to minimize pitching of the vehicle, that extends at an incline and solely in longitudinal direction as viewed in the plan view of FIG. 4. The lower end of the main shock absorber 26 is fastened to the inner side of the mount 24, while the upper end 30 of the shock absorber is fastened to an upper mount 32 and lies at the outer side of the beam 16. While the above-described arrangement by itself reduces pitching to a moderate level for safety of the vehicle, it still permits considerable rocking of the vehicle (pivoting about a longitudinal axis) which is uncomfortable for the occupants.

In accordance with the present invention, an auxiliary anti-rock shock absorber 34 is provided, which can be easily installed on an already-finished motor home and which has been found to greatly reduce rocking of the vehicle as well as also reducing pitching thereof. The auxiliary shock absorber is installed so that it extends at an upward incline and in a lateral direction. The lower end 34a of the auxiliary shock absorber is mounted by a lower bracket or coupling 36 which is attached to the mount 24 previously installed when the vehicle was originally built. The upper end 34b of the shock absorber is attached to the longitudinal beam 16 by a top mounting bracket 38.

The bottom coupling 36 is installed by removing the front lower nuts 38' (FIG. 5) that are attached to the U bolts 22, installing the coupling 36 on the U bolts and reinstalling the nuts 38', and then attaching the lower end of the auxiliary shock absorber 34 to the horizontal plate portion 40 of the coupling by a bolt 42 and nut 44. The upper end of the auxiliary shock absorber is installed by welding the bracket 38 (FIG. 2) to the inside of the lateral beam 16 and installing the upper end of the shock absorber on the bracket using a bolt 45 that extends through the shock absorber end.

The above-installing method enables the lower end 34a (FIG. 3) of the auxiliary shock absorber 34 to lie outward (closer to the wheel 14) of the lower end of the regular shock absorber 26. The coupling 36 can lie below the leaf-spring assembly without interference between the auxiliary shock absorber and leaf-spring assembly, since the auxiliary shock absorber extends laterally. The top mounting bracket 38 holds the upper end 34b of the auxiliary shock absorber at the inner side (the side closest to the center of the vehicle) of the beam 16. This arrangement enables the shock absorber to extend with a large lateral component while utilizing a relatively long auxiliary shock absorber. It has been found that an auxiliary shock absorber 34 oriented at an angle A of 30° from the vertical, provides maximum stability to the motor home against rocking motion of the vehicle, for a wide variety of makes and models of motor homes. Furthermore, it has been found that the auxiliary shock absorber also reduces pitching of the vehicle. When the auxiliary shock absorber 34 was mounted at an angle A of more than 35° or less than 25°, there was a noticeable decrease in its effectiveness in smoothly absorbing small shocks.

The bracket 38 is constructed to support the upper end 34b of a shock absorber on the vertical center portion 16c a longitudinal beam of the vehicle. The vertical portion 16c can rigidly support the weight, as compared to the bottom beam portion 16a which easily bends under a vertical load. The bracket 38 includes an I-beam-like bar 50 that extends from a location adjacent the vertical center portion 16c of the vertical beam to a location beyond the inside of the beam, to hold the shock absorber upper end. The bracket 38 also includes a largely U-shaped member 52 with its opposite legs 54, 56 largely vertical and welded to locations spaced along the length of the bar. One leg 54 of the U-shaped member is also welded to the vertical center portion of the beam, although it could be attached by rivets or bolts. Thus, the force of the shock absorber is transferred by the I-beam-like bar 50 directly to the vertical center portion of the C beam 16 of the vehicle, without requiring support by the bottom beam portion 16b that would bend under the load.

Thus, the invention provides an auxiliary shock absorber installation for a motor home vehicle, which can be easily installed, and which has been found to greatly reduce rocking of the vehicle as well as reducing pitching thereof. The auxiliary shock absorber is installed with its lower end attached by a coupling to the mount used to mount the original shock absorber in place, but with the lower end of the auxiliary shock absorber lying under rather than at the inner side of the leaf spring assembly of the vehicle. The upper end of the auxiliary shock absorber is mounted at the inner side of the longitudinal underbeam of the vehicle. This arrangement allows an auxiliary shock absorber of considerable length to be utilized and mounted on the already-present shock mount and beam parts of the vehicle. The auxiliary shock absorber is preferably installed so that it extends at an upward incline of about 30° from the vertical, and a lateral direction with its upper end closer to the inside of the vehicle than its lower end.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. In a motor home vehicle which includes a tall enclosure with a overhanging rear end, and a rear wheel assembly, said wheel assembly including an axle having wheels at each end, a leaf spring assembly with a middle portion over each end of the axle immediately inside each wheel and opposite ends connected to a beam under the enclosure, and a mount having a lower portion lying under and against said axle and an upper portion extending over said leaf spring middle portion to hold it to said axle, said frame having an elongated beam extending longitudinally along the bottom of each side of the enclosure at a location inward of the wheel, and a shcok absorber extending from said mount in an upward and longitudinal direction to a location at the outer side of an adjacent beam, the improvement of an anti-rock assembly comprising:

a pair of lower mounting couplings each constructed to connect to said mount in a predetermined orientation, each fixture having a shock-engaging portion lying under the leaf spring assembly to hold the lower-end of a shock absorber under the leaf spring assembly;

a pair of upper mounting brackets, each constructed to mount on one of said beams and having a portion lying at the inner side of the beam, to hold the upper end of the shock absorber at the inner side of the beam; and a pair of auxiliary shock absorbers, each having a lower end lying under a corresponding leaf spring and an upper end lying at the inner side of a corresponding beam.

2. The improvement described in claim 1 wherein: said lower coupling and upper mounting brackets are mounted so that each auxiliary shock absorber extends to an angle from the vertical of between 25° and 35°.

3. The improvement described in claim 1 wherein: said beam is of C shape with a vertical middle part and with upper and lower flanges, and each upper mounting bracket includes a portion fixed to the vertical middle part of the beam and an inner end extending inwardly beyond the inner edge of the lower flange of the beam and supporting a shock absorber-holding bolt.

4. The improvement described in claim 1 wherein: said elongated beam has a vertical beam portion; and each of said brackets includes a bar with a greater vertical height than horizontal width at least along its center, said bar having an outer end lying adjacent to said vertical beam portion and an inner end attached to the upper end of an auxiliary shock absorber, each bracket also including a largely U-shaped member having a vertical leg attached to the outer end of the bar and to said vertical beam portion, and another leg attached to said inner bar portion.

5. An anti-rock assembly for use in a motor home vehicle which includes a tall enclosure with an overhanging rear end, a pair of longitudinally extending C-shaped beams of C cross section, a wheel assembly, and original shock absorbers, comprising:

a pair of auxiliary shock absorbers having upper and lower ends;

a pair of lower mounting couplings for coupling the lower ends of the shock absorbers to the wheel assembly; and a pair of upper mounting brackets for coupling the upper ends of the auxiliary shock absorbers to the C-shaped beams;

each upper mounting bracket including a largely U-shaped member with a first leg attachable to the vertical middle portion of a C beam and a second leg, and also including a bar extending between and attached to said legs of said member, including a first bar end lying adjacent to said first leg of said member and a second bar end lying beyond said second leg of said member and having a hole for mounting to the upper end of a shock absorber.

6. A method for increasing the side rock stability and pitch stability of a motor home vehicle which includes a tall enclosure that has an overhanging rear end and a pair of longitudinally-extending beams running along the lower surface of the enclosure near opposite sides thereof, a wheel assembly including a rear wheel assembly having a laterally extending axle with wheels at its opposite ends, a pair of leaf spring assemblies each having a middle portion over an end of the axle immediately inside the corresponding wheel and a pair of ends connected to one of said beams, and a pair of mounts each having a lower portion lying under the axle and an upper portion extending around a corresponding leaf spring, and the vehicle including a pair of shock absorbers each having a lower end attached to a lower portion of a corresponding mount at a location which is below and at the inner side of a corresponding leaf spring and an upper shock end attached to a corresponding beam at a location at the outer side of the beam, comprising:

- mounting a lower bracket with a lower shock mount location, so that the lower shock mount location lies under a corresponding leaf spring;
- mounting an upper bracket with an upper shock mount location on each beam, so that each upper shock mount location lies at the inner side of the corresponding beam; and
- attaching each of a pair of shock absorbers to said brackets with its lower end at a lower shock mount location and its upper end at an upper shock mount location.

* * * * *